United States Patent Office 3,063,994
Patented Nov. 13, 1962

3,063,994
OPTICAL WHITENING AGENTS OF THE STILBENE TRIAZOLE TYPE
Dennis Arthur William Adams, Leeds, and Asim Kumar Sarkar, Castleford, England, assignors to Hickson & Welch Limited, Castleford, England, a British company
No Drawing. Filed Feb. 25, 1958, Ser. No. 717,532
Claims priority, application Great Britain Mar. 1, 1957
10 Claims. (Cl. 260—240)

This invention is concerned with improvements in or relating to optical whitening agents, and is more particularly concerned with certain new compounds for use as optical whitening agents.

Optical whitening agents are substances which in general absorb light in the ultra-violet range of the spectrum and emit in the visible spectrum, usually in the violet to blue-green. Thus, the fluorescence of such compounds when applied to white material tends to counteract any yellow or grey tone.

Optical whitening agents have found extensive use in the treatment of textiles to counteract the yellow or off-white colour which white textiles possess after repeated washing. More recently, however, optical whitening agents have also been used for incorporation in colourless or white synthetic plastic or polymeric materials. Such materials generally have a dull or off-white appearance which can be greatly improved by incorporating minute quantities of optical whitening agents.

Optical whitening agents used to improve the appearance of colourless or white plastic materials should have the following characteristics:

(a) They should be compatible with the polymers, plasticisers etc., comprising the plastic material i.e. from a solid or liquid solution therewith.
(b) They should have a high intensity of fluorescence in such solutions and should not impart any undesirable visible colour to the plastic material.
(c) They should be stable to the action of light.
(d) They should be stable to high temperatures and pressures such as are required for the processing of plastic materials.

We have now found that compounds of the general formula:

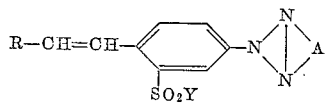

in which R is an unsubstituted or substituted phenyl group, Y is one of the following groups, that is:

a substituted or unsubstituted aryloxy group,
a mono- or di-substituted amino group,
a group NH.CO.NHZ (in which Z is hydrogen or an alkyl or aryl group),
an alkyl group,
an alkylaryl group,
an aryl group, and in which A represents one of the following residues:

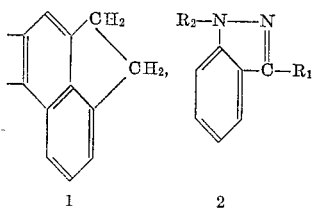

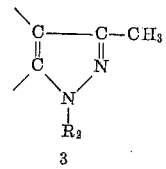

where $R_1$ and $R_2$ are hydrogen or a hydrocarbon radical which may be substituted, constitute improved optical whitening agents for plastics and polymeric material from the point of view of the above-stated desiderata.

Accordingly the invention comprises as new compounds, the compounds of Formula I above.

Where Y in the general Formula I is an aryloxy group, it is preferred that the aryloxy group be a substituted or unsubstituted phenoxy group, any substituents being non-chromophoric. Preferred substituted phenoxy groups are alkyl, for example methyl, and halogen, for example, chlorine, substituted phenoxy groups. Further preferred compounds are those in which Y is a mono- or di-alkyl, hydroxyalkyl or aryl substituted amino group, for example a dimethylamino, diethylamino, β-hydroxyethylamino, dipropylamino, dibutylamino, mono-octylamino, mono-decylamino, mono-anilido or N-methyl-anilido group. The group Y can also advantageously be a cyclohexylamino, morpholino or piperidino group, or the residue of urea or a substituted derivative thereof, for example, mono-methylurea. Finally the group Y can also advantageously be a substituted or unsubstituted phenyl group. Preferred substituted phenyl groups are alkyl, for example methyl, and halogen, for example chlorine, substituted phenyl groups.

In compounds of Formula I above in which A represents residue 1, that is an acenaphtheno group, this may, if desired be substituted with a non-polar substituent, for example, an alkoxy, advantageously a methoxy or ethoxy group or with an alkyl group or a halogen atom. The substituent $R_1$ is preferably hydrogen or an alkyl, aryl or aralkyl group and $R_2$ is preferably hydrogen or an alkyl, aryl, aralkyl, hydroxyalkyl or polyethanoxy group. Preferred groups are lower alkyl, e.g. methyl or ethyl or aryl groups. Where A represents residue 3 above that is a pyrazole residue the group $R_2$ is preferably an aryl group, in particular a phenyl or substituted phenyl group such as a chlorophenyl or sulphophenyl group or an alkylaryl or substituted alkylaryl group, e.g. a tolyl or substituted tolyl group. Where the group R is substituted the substituent or substituents are preferably non-polar groups, such as halogen atoms, for example chlorine atoms or lower alkoxy groups, for example methoxy or ethoxy groups. Preferably such substituents are present in the ortho or para position to the side chain.

It will be appreciated that since the compounds according to the invention are intended for use as optical whitening agents, they must, as is well known, possess no substantial colour.

Specific new compounds according to the invention which are preferred because of their properties are those the preparation of which is described in any one of Examples 1–3 and 6–22 herein.

The compounds according to the invention can be applied to plastic material in any desired way, for example by incorporation therein during production or during subsequent working up. They may also be incorporated in preparations for treatment of plastic or polymeric material, for example in washing agents for the washing of synthetic fibres.

The invention thus provides compositions for the treatment of plastics or polymeric material comprising one or more compounds of the general Formula I above.

The invention also comprises plastics or polymeric material containing or having applied thereto a compound of Formula I above.

The new compounds according to the invention can conveniently be prepared by oxidizing an o-amino azo dye of the Formula II given below, and according to a feature of the invention therefore we provide a process for the preparation of compounds of the general formula:

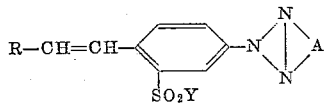

I (where R, Y and A have the above-stated meanings) which comprises oxidising an o-amino azo dye of the general formula:

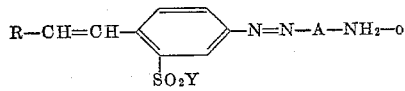

II (where R, Y and A have the meanings stated above).

Alternatively compounds of the general Formula I may be prepared by oxidising an o-amino azo dye of the formula

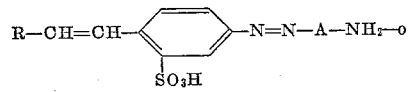

III (in which R and A have the meanings above specified) followed by conversion of the group $SO_3H$ to $SO_2Y$ (where Y has the meaning specified above).

It is preferred to employ a mild oxidising agent for the above oxidations, for example copper sulphate in diethanolamine; cuprammonium sulphate or copper sulphate in the form of a soluble complex with pyridine may also be used, as well as an alkali-metal hypochlorite, for example sodium hypochlorite. Thionyl chloride or sulphuryl chloride may also be used.

The compounds of general Formulas II and III may be prepared in any convenient manner, such as, for example, by diazotising a compound of the formula:

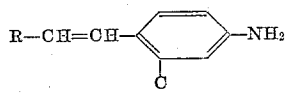

IV (where R has the above-stated meaning and in which C is $SO_3H$, or $SO_2Y$ where Y has the meaning specified above), and coupling the diazotised compound with a compound of the formula $H_2N—A$ (where A has the above stated meaning). The intermediate diazo compound may be isolated if desired.

The compounds of Formula IV can themselves be prepared in any convenient manner. Thus, for example they may be prepared by condensing benzaldehyde with a compound of the formula

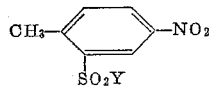

for example in the presence of piperidine, and then reducing the resultant compound. Alternatively, compounds of Formula IV above may be prepared by converting 4-nitro-stilbene-2-sulphonic acid to the corresponding sulphonyl chloride by the action of, for example $POCl_3$ and subsequent condensation with any desired compound, e.g. a phenol, amine, urea, etc., the product being finally reduced to give the compound of Formula IV.

The conversion of the $SO_3H$ group to the $SO_2Y$ group (where Y has the meaning specified) may be effected at any convenient stage in the production of the final product. This conversion is preferably effected by first producing the corresponding sulphonyl chloride and then reacting the sulphonyl chloride to replace the chlorine atom with a group Y as specified herein.

As examples of such reactions may be mentioned the reaction of the sulphonyl chloride with an amine, for example aniline, to form the anilide; the reaction of the sulphonyl chloride with an aromatic hydrocarbon, e.g. benzene or toluene in the presence of a Friedel-Crafts catalyst to form the sulphone; and the reaction of the sulphonyl chloride with a phenol or cresol to form the ester.

The sulphonyl chloride used as starting material may be prepared in any suitable manner for example by heating the parent sulphonic acid with $POCl_3$ or $PCl_5$ in chlorobenzene, or with thionyl chloride.

It will thus be appreciated that in general it is possible when preparing the new compounds according to the invention to introduce the group Y at any convenient stage in the production of the compounds. Thus, one may either introduce the group Y as a last stage in the production of the new compounds by reacting the corresponding sulphonyl chloride with a desired compound or one may start with a compound containing the group $SO_2Y$ for example with a compound having either the general Formula III or IV set out above.

In order that the invention may be further understood, the following examples are given by way of illustration only:

EXAMPLE 1

*2-Stilbyl-Acenaphtheno-(4:5-4':5')-Triazole-2"-Sulphon-Cyclohexylamide*

35.5 parts of 4-amino-stilbene-2-sulphoncyclohexylamide are dissolved in 600 parts of glacial acetic acid. 200 parts of ice are added and the whole is diazotised at 10–15° C. with an aqueous solution of 6.9 parts of sodium nitrite. The diazo compound obtained is then coupled with a solution of 21.8 parts of 5-amino-acenaphthene sulphate in 500 parts of water at 10–15° C. The pH of the mixture is brought back to neutrality by addition of sodium acetate.

On completion of this coupling the o-amino azo dyestuff is filtered off and washed. The dyestuff is then dissolved in 600 parts pyridine and a mixture of 60 parts copper sulphate, 60 parts water, and 60 parts concentrated ammonia are added and the whole refluxed until the oxidation of the dyestuff is complete. The product is isolated by the acidification of the oxidation mixture, filtered off and washed. It is then recrystallised from 80% aqueous pyridine, to give a pale yellow crystalline product.

EXAMPLE 2

*2-Stilbyl-Acenaphtheno-(4:5-4':5')-Triazole-2"-Phenyl-Sulphonate*

35.1 parts of 4-amino-stilbene-2-phenyl sulphonate are dissolved in 1200 parts glacial acetic acid. 200 parts of ice are added and the whole is diazotised at 10–15° C. with an aqueous solution of 6.9 parts of sodium nitrite. The diazo compound obtained is then coupled with a solution of 21.8 parts of 5-amino-acenaphthene sulphate in 500 parts water at 10–15° C. The pH of the mixture is brought back to neutrality by the addition of sodium acetate.

On completion of this coupling the o-amino azo dyestuff is filtered off and washed. The dyestuff is then dissolved in 600 parts pyridine and a mixture of 60 parts copper sulphate, 60 parts water and 60 parts concentrated ammonia are added and the whole refluxed until the oxidation of the dyestuff is complete. The triazole is precipitated during the reaction and removed by filtering the cooled oxidation mixture. It is recrystallised from 80% aqueous pyridine as yellow crystals.

EXAMPLE 3

2-Stilbyl-Acenaphtheno-(4:5-4':5')-Triazole-2''-Sulphon-Dimethylamide

A solution of 30.2 parts 4-amino-stilbene-2-sulphondimethylamide in 60 parts glacial acetic acid are cooled by the addition of 200 parts of ice. It is then diazotised at 10–15° C. with an aqueous solution of 6.9 parts sodium nitrite and the diazo compound obtained is coupled with a solution of 20.5 parts 5-amino-acenaphthene hydrochloride in 100 parts water at 10–15° C. The pH of the mixture is brought back to neutrality by the addition of sodium acetate.

On completion of this coupling the o-amino azo dyestuff is filtered off and washed. The dyestuff is then dissolved in 800 parts pyridine and a mixture of 60 parts copper sulphate, 60 parts water and 60 parts concentrated ammonia is added and the whole refluxed until the oxidation of the dyestuff is complete. After the oxidation, the solution is acidified and filtered. The product is recrystallised from benzene to give yellow crystals.

EXAMPLE 4

When a piece of nylon is washed with a soap solution containing 0.1% of the compound obtained in Example 1 (on the weight of the cloth), the nylon appears to be whiter and brighter than the commencing material.

The dispersion of the compound in soap solution is obtained by dissolving the compound in diethylene glycol and then adding to the soap solution.

Similarly, terylene washed in the above manner also appears whiter and brighter.

EXAMPLE 5

100 parts of polystyrene powder are homogeneously mixed at about 140° C. with .02 part of the compound mentioned in Example 2. The hard disc obtained is then broken up and the product is processed by pressing.

Contrasted with products not having the addition of the brightening agent named, this product has a considerably lighter appearance in daylight.

EXAMPLE 6

2-Stilbyl-Acenaphtheno-(4:5-4':5')-Triazole-2''-Sulphon-Dibutylamide

A solution of 38.6 parts of 4-aminostilbene-2-sulphondibutylamide in 500 parts of acetic acid is diazotised by the addition of an aqueous solution of 6.9 parts of sodium nitrite at 8–10° C. The diazonium compound is coupled with a solution of 21.8 parts of 5-aminoacenaphthene sulphate in 1000 parts of water and 100 parts of sodium acetate in 100 parts of water is added to maintain the pH at 8. After the coupling the dye is filtered off and washed. The wet cake is dissolved in 600 parts of pyridine and refluxed for 3 hours with a solution of 60 parts of copper sulphate in 100 parts of water and excess ammonia. When the addition is complete the product is isolated by acidification and the dry triazole is recrystallised from acetone. The pure product melts at 156° C.

EXAMPLE 7

2-Stilbyl-Acenaphtheno-(4:5-4':5')-Triazole-2''-Sulphon-β-Hydroxy-Ethylamide A solution of 31.8 parts of 4-aminostilbene-2-sulphon-β-hydroxy ethylamide in 500 parts dilute hydrochloric acid is diazotised by the addition of an aqueous solution of 6.9 parts of sodium nitrite at 8–10° C. The diazonium compound is coupled with a solution of 21.8 parts of 5-aminoacenaphthene sulphate in 1000 parts of water and 100 parts of sodium acetate in 100 parts of water is added to maintain the pH at 8. After the coupling the dye is filtered off and washed. The wet cake is dissolved in 600 parts of pyridine and refluxed for 3 hours with a solution of 60 parts of copper sulphate in 100 parts of water and excess ammonia. When the oxidation is complete the product is isolated by acidification and the crude triazole is recrystallised as a light yellow solid from 50% aqueous pyridine. It melts at 240° C.

EXAMPLE 8

2-Stilbyl-Acenaphtheno-(4:5-4':5')-Triazole-2''-Sulphon-Decylamide 12 parts of sodium 2-stilbyl-acenaphtheno-(4:5–4':5')-triazole-2''-sulphonate are refluxed on an oil bath with a solution of 6 parts of phosphorous pentachloride in 100 parts of chlorobenzene, until a clear solution is obtained. Active charcoal is added and the solution filtered hot. 2-stilbyl-acenaphtheno-(4:5-4':5')-triazole-2'' - sulphonyl chloride crystallises from the solution on cooling and is filtered off and washed with acetone 8–9 parts. The product melts at 232–233° C.

5 parts of the sulphonyl chloride are heated on an oil bath at 190° C. for 4 hours with 40 parts of n-decylamine. After the reaction the solution is poured into a mixture of 60 parts of hydrochloric acid and 120 parts of alcohol. The crystalline yellow solid is filtered off and washed with alcohol. After recrystallisation from 15% alcoholic pyridine a yellow triazole is obtained melting at 170° C.

EXAMPLE 9

2-Stilbyl-Acenaphtheno-(4:5-4':5')-Triazole-2''-Sulphon-Octylamide 5 parts of 2-stilbyl-acenaphtheno-(4:5-4':5')-triazole-2''-sulphonyl-chloride (obtained as in Example 8) are heated under reflux with 40 parts of n-octylamine for 4 hours. After the reaction the solution is poured into a mixture of 60 parts of hydrochloric acid and 120 parts of alcohol. The solid is filtered, washed with alcohol and dried. It melts at 142° C.

EXAMPLE 10

2-Stilbyl-Acenaphtheno-(4:5-4':5')-Triazole-2''-Sulphon-Methylanilide 5 parts of 2-stilbyl-acenaphtheno-(4:5-4':5')-triazole-2''-sulphonyl chloride (obtained as in Example 8) are refluxed with 40 parts of methylaniline on an oil bath for 3 hours. The solution is cooled and poured into a mixture of 100 parts of hydrochloric acid and 120 parts of alcohol. The solid is filtered, washed with alcohol and recrystallised from 35% alcoholic pyridine. The recrystallised triazole melts at 214° C.

EXAMPLE 11

2-Stilbyl-Acenaphtheno-(4:5-4':5')-Triazole-2''-Sulphon-Morpholide 5 parts of 2-stilbyl-acenaphtheno-(4:5-4':5')-triazole-2''-sulphonyl chloride (obtained as in Example 8) are refluxed with 40 parts of morpholine on an oil bath for 3 hours. The solution is cooled and poured into a mixture of 100 parts of hydrochloric acid and 120 parts of alcohol. The solid is filtered off, washed with water and alcohol, and recrystallised from 50% alcoholic pyridine. The pure product melts at 232° C.

EXAMPLE 12

2-Stilbyl-Acenaphtheno-(4:5-4':5')Triazole-2''-Sulphon-Anilide 5 parts of 2-stilbyl-acenaphtheno-(4:5-4':5')-triazole-2''-sulphonyl chloride (obtained as in Example 8) are refluxed with 40 parts of aniline on an oil bath for 3 hours. The solution is cooled and poured into a mixture of 100 parts of hydrochloric acid and 120 parts of alcohol. The solid is filtered, washed with alcohol and recrystallised from 20% alcoholic pyridine. The triazole melts at 235° C.

EXAMPLE 13

*2-Stilbyl-Acenaphtheno-(4:5-4':5')-Triazole-2"-Chlorophenyl-Sulphone*

5 parts of 2-stilbyl-acenaphtheno-(4:5-4':5')-triazole-2"-sulphonyl chloride (obtained as in Example 8) are heated under reflux for half-an-hour with 5 parts of aluminium trichloride and 40 parts of chlorobenzene. The reaction mixture is then poured into iced water and the chlorobenzene distilled off with steam. The solid residue is filtered off, dried, and extracted with alcohol. On dilution with water the sulphone is obtained as a light yellow precipitate melting at 128° C.

EXAMPLE 14

*2-Stilbyl-Acenaphtheno-(4:5-4':5')-Triazole-2"-Phenyl-Sulphonate*

A solution of 35.1 parts of 4-aminostilbene-2-phenyl sulphonate in 1000 parts of acetic acid is diazotised by the addition of an aqueous solution of 6.9 parts of sodium nitrite at 8–10° C. The diazonium compound is coupled with a solution of 21.8 parts of 5-aminoacenaphthene sulphate in 1000 parts of water and 100 parts of sodium acetate in 100 parts of water is added to maintain the pH at 8. After the coupling the dye is filtered off and washed. The wet cake is dissolved in 600 parts of pyridine and refluxed for 3 hours with a solution of 60 parts of copper sulphate in 100 parts of water and excess ammonia. When the oxidation is complete the product crystallises from the reaction mixture on cooling. It is filtered off and recrystallised from 80% aqueous pyridine. The pure triazole melts at 204° C.

EXAMPLE 15

*2-Stilbyl-Acenaphtheno-(4:5-4':5')-Triazole-2"-o-Cresyl-Sulphonate*

5 parts of 2-stilbyl-acenaphtheno-(4:5-4':5')-triazole-2"-sulphonyl chloride (obtained as in Example 8) are refluxed with 35 parts of o-cresol and 4 parts of 100° Tw. sodium hydroxide solution for 3 hours. After cooling the solution is poured into 300 parts of dilute sodium hydroxide solution, filtered and the solid washed with hot water and alcohol. After recrystallisation from 45% alcoholic pyridine the triazole melts at 200° C.

EXAMPLE 16

*2-Stilbyl-Acenaphtheno-(4:5-4':5')-Triazole-2"-(p-Chlorophenyl)-Sulphonate*

5 parts of 2-stilbyl-acenaphtheno-(4:5-4':5')-triazole-2"-sulphonyl chloride (obtained as in Example 8) are refluxed with 25 parts of p-chlorophenol and 4 parts of 100° Tw. sodium hydroxide solution for 2 hours. The mixture is poured into 300 parts of dilute sodium hydroxide solution, filtered and the solid washed with hot water and alcohol. The triazole, which was recrystallised from 60% aqueous pyridine, melts at 222° C.

EXAMPLE 17

*2-(4'''-Methoxy)Stilbyl-Acenaphtheno-(4:5-4':5')-Triazole-2"-Sulphon-Anilide*

21 parts of sodium 2-(4'''-methoxy)-stilbyl-acenaphtheno-(4:5-4':5')-triazole-2"-sulphonate are refluxed on an oil bath with a solution of 10 parts of phosphorus pentachloride in 500 parts of chlorobenzene, until a clear solution is obtained. The solution is filtered hot and the sulphonyl chloride crystallises on cooling. This is filtered off and washed with acetone, and dried.

5 parts of 2 - (4''' - methoxy) - stilbyl - acenaphtheno-(4:5-4':5')-triazole-2"-sulphonyl chloride are heated under reflux for 3 hours with 50 parts of aniline and the product is obtained by pouring the reaction mixture into 300 parts of 50% alcoholic hydrochloric acid. The triazole is filtered off and recrystallised from 25% alcoholic pyridine. It melts at 239° C.

EXAMPLE 18

*2-Stilbyl-(1'-Phenyl-3'-Methyl)-Pyrazolo-(4:5-4':5') Triazole-2"-Sulphondimethylamide*

A solution of 15.1 parts of 4-aminostilbene-2-sulphondimethylamide in 200 parts acetic acid is diazotised by the addition of an aqueous solution of 3.45 parts of sodium nitrite at 8–10° C. The diazonium compound is coupled with a solution of 8.7 parts of 1-phenyl-3-methyl-5-aminopyrazole in 200 parts dilute hydrochloric acid, and the yellowish dye filtered off. The azo compound is oxidised by dissolving in 200 parts pyridine and refluxing with 30 parts of copper sulphate in 100 parts of water and excess ammonia for 3 hours. After the reaction the mixture is cooled and the crude triazole removed by filtration. The deep-cream triazole, re-crystallised from phosphorus oxychloride, melts at 204° C.

EXAMPLE 19

*2-Stilbyl-(1'-Phenyl-3'-Methyl)-Pyrazolo-(4:5-4':5') Triazole-2"-Sulphonanilide*

10 parts of sodium 2-stilbyl-(1-phenyl-3'-methyl)-pyrazolo-(4:5-4':5')-triazole-2"-sulphonate are refluxed for 1 hour with 10 parts of phosphorus pentachloride and 100 parts chlorobenzene. At the end of this time the solid is all in solution; active charcoal is added to the solution and it is filtered hot. On cooling 2-stilbyl-(1'-phenyl - 3' - methyl) - pyrazolo - (4:5-4':5')-triazole-2"-sulphonyl chloride crystallises and is filtered off. It melts at 213° C.

5 parts of 2-stilbyl-(1'-phenyl-3'-methyl)-pyrazolo-(4:5-4':5')-triazolo-2"-sulphonyl chloride and 40 parts of aniline are heated under reflux for 3 hours. After the reaction the solution is poured into dilute alcoholic hydrochloric acid and the product filtered off and washed with alcohol. It is recrystallised from 25% alcoholic pyridine and the primrose yellow compound melts at 233° C.

EXAMPLE 20

*2-Stilbyl-(1'-Phenyl-3'-Methyl)-Pyrazolo-(4:5-4':5') Triazolo-2"-Phenyl Sulphone*

5 parts of 2-stilbyl (1'-phenyl-3'-methyl)-pyrazolo-(4:5-4':5')-triazole-2"-sulphonyl chloride are heated on an oilbath for half-an-hour with 40 parts of benzene and 5 parts of aluminium trichloride. The reaction mixture is poured onto ice and the benzene distilled off. The residue is filtered off from the water and extracted with alcohol. On dilution with water the sulphone is obtained as a dirty yellow solid, melting at 80° C.

EXAMPLE 21

*2-Stilbyl-(1'-Phenyl-3'-Methyl)-Pyrazolo-(4:5-4':5') Triazole-2"-Phenyl Sulphonate*

5 parts of 2-stilbyl-(1'-phenyl-3'-methyl)-pyrazolo-(4:5-4':5')-triazole-2"-sulphonyl chloride are heated under reflux with 40 parts of phenol and 4 parts of sodium hydroxide solution for 3 hours. The mixture is poured into dilute sodium hydroxide solution and the solid filtered off, washed with hot water and alcohol. After recrystallisation from 60% aqueous pyridine the product is obtained as a lemon yellow powder melting at 191° C.

EXAMPLE 22

*2-Stilbyl-Indazolo(4:5-6':7')Triazole-2"-Sulphon-Dimethylamide*

A solution in 150 parts of diethylene glycol of 15.1 parts 4-amino-stilbene-2-sulphon-dimethylamide is acidified with 12.5 parts of hydrochloric acid and directly diazotised at 8–10° C. by the addition of a solution of 3.45 parts of sodium nitrite. The diazo compound is isolated, suspended in water and mixed with a solution of 6.65 parts of 6-amino-indazole in dilute hydrochloric acid to effect the coupling of the components. When coupling is complete the o-amino azo dyestuff obtained is salted out and filtered at 25–30° C. The dyestuff is dissolved in pyridine and oxidised by refluxing for 3 hours with 30 parts of copper sulphate and 35 parts of ammonia with 60 parts of water. After the reaction is complete the mixture is acidified and the crude product filtered off. The triazole is recrystallised from 80% aqueous pyridine and the buff-brown product melts at 227° C.

We claim:
1. 2 - stilbyl-acenaphtheno-(4:5-4′:5′)-triazole-2″-sulphon-cyclohexylamide.
2. 2 - stilbyl - acenaphtheno-(4:5-4′:5′)-triazole-2″-phenyl-sulphonate.
3. 2 - stilbyl-acenaphtheno-(4:5-4′:5′)-triazole-2″-sulphon-dimethylamide.
4. 2 - stilbyl-acenaphtheno-(4:5-4′:5′)-triazole-2″-sulphon-dibutylamide.
5. 2 - stilbyl - acenaphtheno-(4:5-4′:5′)-triazole-2″-sulphon-β-hydroxy-ethylamide.
6. 2 - stilbyl - acenaphtheno-(4:5-4′:5′)-triazole-2″-sulphon-octylamide.
7. 2 - stilbyl - acenaphtheno-(4:5-4′:5′)-triazole-2″-sulphon-morpholide.
8. 2 - stilbyl - acenaphtheno-(4:5-4′:5′)-triazole-2″-o-cresyl-sulphonate.
9. 2 - stilbyl-acenaphtheno-(4:5-4′:5′)-triazole-2″-(p-chlorophenyl)-sulphonate.
10. A compound selected from the group consisting of compounds of the formulas

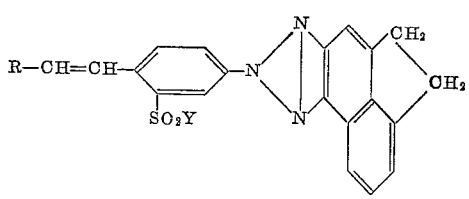

and

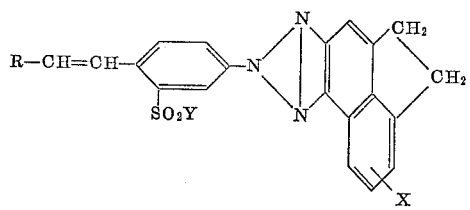

in which R is monocyclic aryl; Y is a member selected from the group consisting of monocyclic aryloxy, amino substituted by at least one alkyl group of 1–10 carbon atoms, anilino, N-methyl anilino, cyclohexylamino, morpholino, piperidino, monocyclic aryl and hydroxy lower alkylamino; and X is a member selected from the group consisting of halogen, lower alkyl and lower alkoxy.

References Cited in the file of this patent
UNITED STATES PATENTS

| | | |
|---|---|---|
| 2,713,057 | Zweidler et al. | July 12, 1945 |
| 2,765,239 | Siegrist | Oct. 2, 1956 |
| 2,784,184 | Zweidler et al. | Mar. 5, 1957 |
| 2,817,665 | Zweidler et al. | Dec. 24, 1957 |
| 2,845,419 | Siegrist et al. | July 29, 1958 |
| 2,928,830 | Adams et al. | Mar. 15, 1960 |

FOREIGN PATENTS

| | | |
|---|---|---|
| 561,464 | Belgium | Oct. 31, 1957 |

OTHER REFERENCES

Charrier et al.: Gazz. Chim. Ital., vol. 55, pages 745–754 (1925).

Beilsteins Handbuch der Organischen Chemie, vol. 26, 4th ed., EII, pages 47–48 (1954).

Derwent: Commonwealth Patents Report, vol. 187, Indian 187 GP 2 A, page 1 (May 13, 1960) [Abstract of Indian Patent 64,719, issued April 19, 1960].